United States Patent
Isemura et al.

(10) Patent No.: US 7,346,717 B2
(45) Date of Patent: Mar. 18, 2008

(54) CONTROL BOARD, IMAGE FORMING APPARATUS HAVING THE SAME, CONTROL BOARD MANAGEMENT METHOD, COMPUTER PROGRAM, AND COMPUTER-READABLE STORAGE MEDIUM

(75) Inventors: Keizo Isemura, Koganei (JP); Tomohiro Tamaoki, Moriya (JP); Kenji Hiromatsu, Abiko (JP); Shunichi Komatsu, Abiko (JP); Izuru Horiuchi, Toride (JP); Takahiro Ushiro, Toride (JP)

(73) Assignee: Canon Kabushiki Kaisha (JP)

( * ) Notice: Subject to any disclaimer, the term of this patent is extended or adjusted under 35 U.S.C. 154(b) by 196 days.

(21) Appl. No.: 11/286,136

(22) Filed: Nov. 23, 2005

(65) Prior Publication Data

US 2006/0143343 A1    Jun. 29, 2006

(30) Foreign Application Priority Data

Nov. 25, 2004  (JP)  ............................. 2004-340809
Nov. 8, 2005   (JP)  ............................. 2005-324052

(51) Int. Cl.
    G06F 13/00    (2006.01)
(52) U.S. Cl. .................... 710/104; 710/306; 710/8; 710/10; 710/301; 358/1
(58) Field of Classification Search ........ 710/300–315, 710/62–64, 72, 8–19; 358/1.15, 1, 15
See application file for complete search history.

(56) References Cited

U.S. PATENT DOCUMENTS

| | | | |
|---|---|---|---|
| 5,491,830 A * | 2/1996 | Ferri .............................. | 710/9 |
| 5,537,663 A * | 7/1996 | Belmont et al. ............... | 710/17 |
| 5,930,389 A * | 7/1999 | Tanio .......................... | 382/167 |
| 6,141,712 A * | 10/2000 | Sudhakaran et al. ........ | 710/104 |
| 6,289,405 B1* | 9/2001 | Movall et al. ............... | 710/104 |
| 6,745,147 B2* | 6/2004 | Ahrens et al. ............... | 702/127 |
| 6,968,407 B2* | 11/2005 | Park et al. ................... | 710/110 |
| 6,968,414 B2* | 11/2005 | Abbondanzio et al. ..... | 710/301 |
| 6,996,648 B2* | 2/2006 | Vu .............................. | 710/302 |
| 2004/0109195 A1* | 6/2004 | Davis et al. ............... | 358/1.15 |

FOREIGN PATENT DOCUMENTS

JP    4-120129 U    10/1992
JP    09-237241 A   9/1997

* cited by examiner

Primary Examiner—Raymond N Phan
(74) Attorney, Agent, or Firm—Rossi, Kimms & McDowell, LLP

(57) ABSTRACT

A control board includes a main-board and a plurality of sub-boards which control loads. The sub-boards each include a providing unit which provides a board type ID, a read unit which reads an installation location ID, and a transmission unit which transmits the board type ID and the installation location ID to the main-board. The main-board includes a communication control unit, a configuration information acquisition unit which acquires configuration information expressed by a combination of the board type ID and the installation location ID, an analysis unit which analyzes the configuration information, and a control unit which controls the sub-unit on the basis of information analyzed by the analysis unit.

11 Claims, 14 Drawing Sheets

FIG. 5

| BOARD TYPE ID | | | | | BOARD CONTENTS |
|---|---|---|---|---|---|
| SW3 | SW2 | SW1 | SW0 | | |
| 0 | 0 | 0 | 0 | : | NONE |
| 0 | 0 | 0 | 1 | : | ONE A MOTOR + ONE SENSOR |
| 0 | 0 | 1 | 0 | : | ONE B MOTOR + ONE SENSOR |
| 0 | 0 | 1 | 1 | : | ONE C MOTOR + ONE SENSOR |
| 0 | 1 | 0 | 0 | : | TWO A MOTORS |
| 0 | 1 | 0 | 1 | : | TWO B MOTORS |
| 0 | 1 | 1 | 0 | : | TWO C MOTORS |
| 0 | 1 | 1 | 1 | : | RESERVE 1 |
| 1 | 0 | 0 | 0 | : | RESERVE 2 |
| 1 | 0 | 0 | 1 | : | RESERVE 3 |
| 1 | 0 | 1 | 0 | : | RESERVE 4 |
| 1 | 0 | 1 | 1 | : | FOR HIGH-VOLTAGE OUTPUT 1 |
| 1 | 1 | 0 | 0 | : | FOR HIGH-VOLTAGE OUTPUT 2 |
| 1 | 1 | 0 | 1 | : | TWO AD INPUTS |
| 1 | 1 | 1 | 0 | : | FOUR AD INPUTS |
| 1 | 1 | 1 | 1 | : | — |

FIG. 6

| INSTALLATION LOCATION ID | | | | INSTALLATION LOCATION DETAILS | | BOARD CONTENTS | BOARD TYPE ID | | | |
|---|---|---|---|---|---|---|---|---|---|---|
| SW7 | SW6 | SW5 | SW4 | | | | SW3 | SW2 | SW1 | SW0 |
| 0 | 0 | 0 | 0 | : NONE | ↔ | NONE | — | — | — | — |
| 0 | 0 | 0 | 1 | : UPPER CASSETTE PAPER FEED UNIT | ↔ | ONE A MOTOR + ONE SENSOR | 0 | 0 | 0 | 1 |
| 0 | 0 | 1 | 0 | : LOWER CASSETTE PAPER FEED UNIT | ↔ | ONE A MOTOR + ONE SENSOR | 0 | 0 | 0 | 1 |
| 0 | 0 | 1 | 1 | : FIRST VERTICAL PATH CONVEYANCE ROLLERS | ↔ | ONE A MOTOR + ONE SENSOR | 0 | 0 | 0 | 1 |
| 0 | 1 | 0 | 0 | : SECOND VERTICAL PATH CONVEYANCE ROLLERS | ↔ | ONE A MOTOR + ONE SENSOR | 0 | 0 | 0 | 1 |
| 0 | 1 | 0 | 1 | : THIRD VERTICAL PATH CONVEYANCE ROLLERS | ↔ | ONE A MOTOR + ONE SENSOR | 0 | 0 | 0 | 1 |
| 0 | 1 | 1 | 0 | : FOURTH VERTICAL PATH CONVEYANCE ROLLERS | ↔ | ONE A MOTOR + ONE SENSOR | 0 | 0 | 0 | 1 |
| 0 | 1 | 1 | 1 | : REGISTRATION UNIT | ↔ | ONE B MOTOR + ONE SENSOR | 0 | 0 | 1 | 0 |
| 1 | 0 | 0 | 0 | : DOUBLE-SIDED CONVEYANCE UNIT 1 | ↔ | TWO B MOTORS | 0 | 1 | 0 | 1 |
| 1 | 0 | 0 | 1 | : DOUBLE-SIDED CONVEYANCE UNIT 2 | ↔ | TWO B MOTORS | 0 | 1 | 0 | 1 |
| 1 | 0 | 1 | 0 | : DOUBLE-SIDED CONVEYANCE UNIT 3 | ↔ | ONE C MOTOR + ONE SENSOR | 0 | 0 | 0 | 1 |
| 1 | 0 | 1 | 1 | : FIXING UNIT 1 | ↔ | ONE C MOTOR + ONE SENSOR | 0 | 0 | 0 | 1 |
| 1 | 1 | 0 | 0 | : FIXING UNIT 2 | ↔ | TWO AD INPUTS | 1 | 1 | 1 | 1 |
| 1 | 1 | 0 | 1 | : PRIMARY HIGH-VOLTAGE UNIT | ↔ | FOR HIGH-VOLTAGE OUTPUT 1 | 1 | 0 | 0 | 1 |
| 1 | 1 | 1 | 0 | : TRANSFER HIGH-VOLTAGE UNIT | ↔ | FOR HIGH-VOLTAGE OUTPUT 1 | 1 | 1 | 1 | 1 |
| 1 | 1 | 1 | 1 | : SEPARATION HIGH-VOLTAGE UNIT | ↔ | FOR HIGH-VOLTAGE OUTPUT 2 | 1 | 1 | 0 | 0 |

FIG. 12A

CONNECT [ONE A MOTOR + ONE SENSOR]
WITH BOARD TYPE ID = 0001 TO
[4-TH VERTICAL PATH CONVEYANCE ROLLERS]
WITH INSTALLATION LOCATION ID = 0100

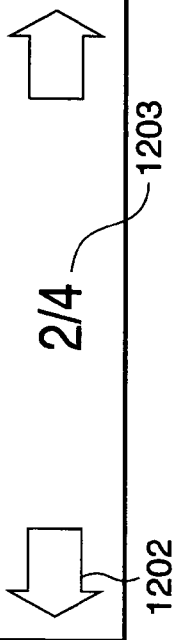

CONNECT [ONE B MOTOR + ONE SENSOR]
WITH BOARD TYPE ID = 0010
TO [REGISTRATION UNIT]
WITH INSTALLATION LOCATION ID = 0111

CONNECT [TWO B MOTORS]
WITH BOARD TYPE ID = 0101
TO [DOUBLE-SIDED CONVEYANCE UNIT 1]
WITH INSTALLATION LOCATION ID = 1000

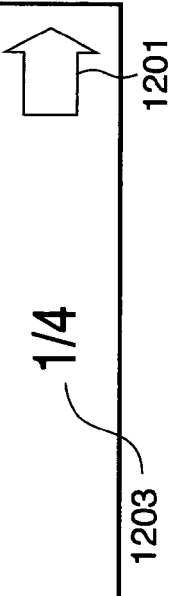

CONNECT [TWO AD INPUTS]
WITH BOARD TYPE ID = 1101
TO [FIXING UNIT 2]
WITH INSTALLATION LOCATION ID = 1100

4/4

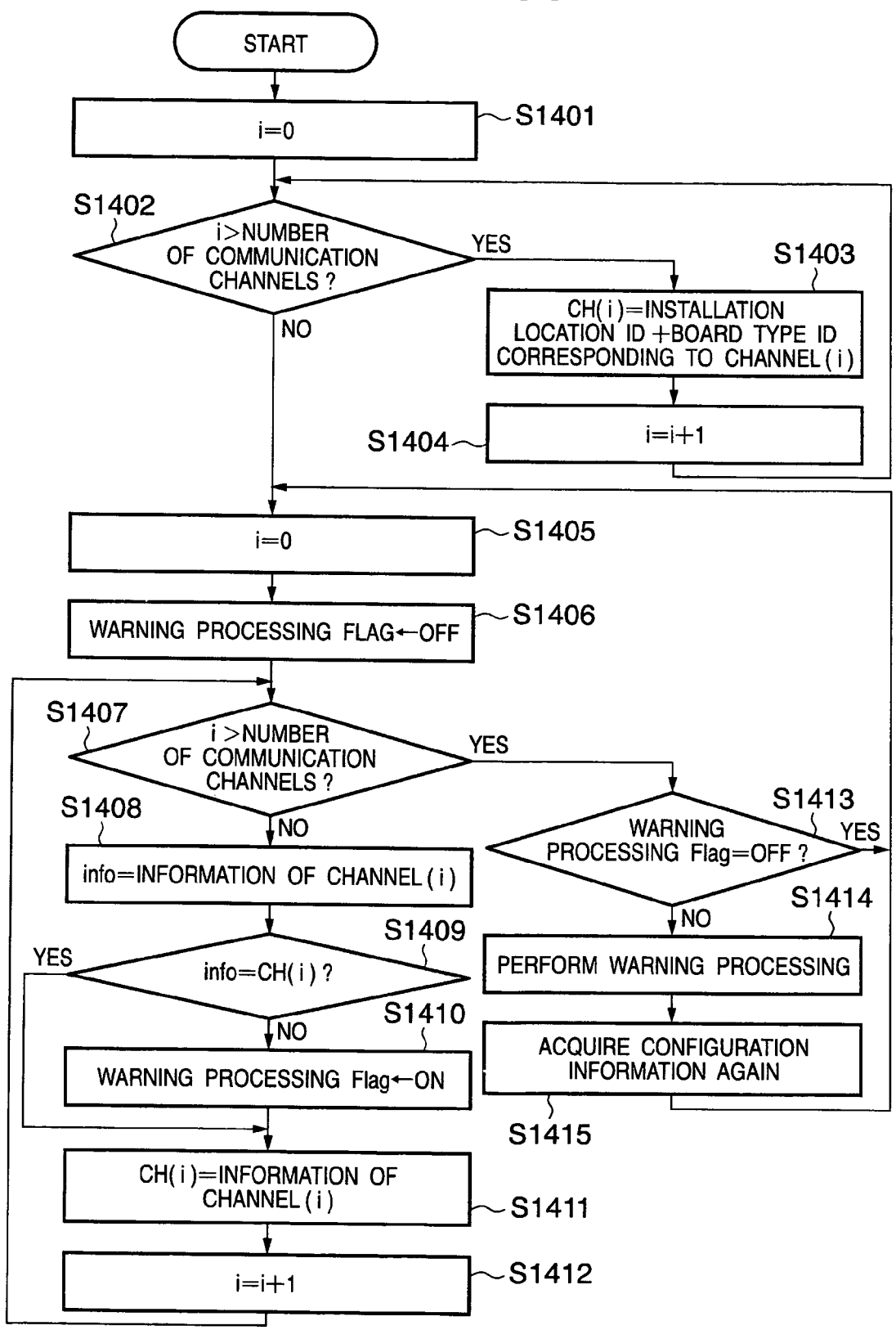

CONTROL BOARD, IMAGE FORMING APPARATUS HAVING THE SAME, CONTROL BOARD MANAGEMENT METHOD, COMPUTER PROGRAM, AND COMPUTER-READABLE STORAGE MEDIUM

FIELD OF THE INVENTION

The present invention relates to a control board comprising a plurality of sub-boards and, more particularly, to a control board which recognizes the connection positions and types of sub-boards and subsequently controls an image forming apparatus, and an image forming apparatus comprising the control board.

BACKGROUND OF THE INVENTION

Conventionally, when a mother board (main-board) and a plurality of sub-boards are to be connected, some considerations are made to prevent connection errors between the mother board and the plurality of sub-boards. For example, in a case where these sub-boards respectively use connectors having different numbers of pins, or these sub-boards uses connectors having the same number of pins, their positions on a mother board are set apart from each other. If, for example, there are a plurality of boards which control the same type of motor, connectors having different numbers of pins are intentionally prepared, or connectors having the same number of pins but having different shapes are prepared to prevent connection errors in assembly.

For example, Japanese Patent Application Laid-Open No. 9-237241 discloses a technique of receiving board information and physical information to form a table, registering corresponding logical numbers, and subsequently using the logical numbers for control.

According to Japanese Patent Application Laid-Open No. 9-237241, however, a control board is not allowed to be inserted in a connector at an arbitrary position on a mother board (DCON) without causing any inconvenience in control.

In addition, changing the shapes or numbers of pins of connectors leads to an increase in cost. Making the shapes of sub-boards, each having a similar function, different from each other also leads to an increase in cost. Furthermore, the connector layout on a board has recently become complicated as compared with before. Moreover, cables which connect a mother board and sub-boards differ in the number of wires for the respective connections. Consequently, as cable arrangements differ from each other in the overall arrangement, the types of cable arrangements to be used increase in number and diversify. For this reason, in apparatus assembly, an apparatus must be assembled without any errors by coping with such problems as well.

Japanese Utility Model Application Laid-Open No. 4-120129 discloses an arrangement in which slots (connectors) are provided on a mother board so as to directly connect a plurality of sub-boards. According to this arrangement, each slot recognizes the type of connected sub-slot. By virtue of this arrangement, any sub-board can be connected to any slot.

The arrangement by Japanese Utility Model Application Laid-Open No. 4-120129 is properly applicable to only a case where these sub-boards are directly connected to a mother board. However, in a case where a plurality of sub-boards are to be connected to several positions within an apparatus main body, these connection positions must be correct.

Provided that there are several sub-boards, each holding a motor, these sub-boards must be connected to respective proper installation positions so that each motor on each sub-board can drive proper part of an apparatus. In other words, even though a sub-board is connectable to any connector on a mother board via a cable, if the connection in an apparatus main body is incorrect, the apparatus can not operate properly.

SUMMARY OF THE INVENTION

Accordingly, the present invention is conceived as a response to the above-described disadvantages of the conventional art.

For example, a control board and image forming apparatus integrating the control board according to the present invention is capable of coping with diversified board arrangements and avoiding an increase in cost.

According to one aspect of the present invention, preferably, there is provided a control board comprising a main-board and a plurality of sub-boards which control loads on portions of an electric unit to be implemented, wherein each of the plurality of sub-boards includes: providing means for providing a board type ID for specifying a type of board, read means for reading an installation location ID representing a location in the electric unit at which the sub-board is to be installed, and transmission means for transmitting the board type ID and the installation location ID read by the read means to the main-board after the sub-board has been installed at the installation location, and the main-board includes: communication control means for controlling communication through a plurality of common communication connectors, configuration information acquisition means for acquiring configuration information expressed by a combination of the board type ID and the installation location ID transmitted from the sub-board by the transmission means through one of the plurality of common communication connectors, analysis means for analyzing the configuration information acquired by the configuration information acquisition means and which ordinal number of a connector, of the plurality of common communication connectors, has received the information, and control means for controlling the sub-board on the basis of information analyzed by the analysis means.

According to another aspect of the present invention, preferably, there is provided an image forming apparatus which comprises a main-board and a plurality of sub-boards which control loads on portions of the apparatus and forms an image by causing each sub-board to control operation required for image formation, wherein each of the plurality of sub-boards includes: providing means for providing a board type ID for specifying a type of board, read means for reading an installation location ID representing a location in the apparatus on which the sub-boards have been installed, and transmission means for transmitting the board type ID and the installation location ID read by the read means to the main-board after the sub-board has been installed at the installation location, and the main-board includes: communication control means for controlling communication through a plurality of common communication connectors, configuration information acquisition means for acquiring configuration information expressed by a combination of the board type ID and the installation location ID transmitted from the sub-board by the transmission means through one of the plurality of common communication connectors, analysis means for analyzing the configuration information acquired by the configuration information acquisition means and which ordinal number of a connector, of the plurality of common communication connectors, has received the information, and control means for controlling the sub-board on the basis of information analyzed by the analysis means.

According to still another aspect of the present invention, preferably, there is provided a management method, in a control board to be implemented in an electric unit and including a main-board and a plurality of sub-boards which control loads on portions of the electric unit, which manages connection between the main-board and the plurality of sub-boards, comprising: a providing step of providing a board type ID for specifying a type of board from each of the plurality of sub-boards; a read step of reading an installation location ID representing a location in the electric unit at which each of the plurality of sub-boards is to be installed; a transmission step of transmitting the board type ID and the installation location ID read at said read step to the main-board after each of the plurality of sub-boards has been installed at the installation location; a configuration information acquisition step of acquiring configuration information expressed by a combination of the board type ID and the installation location ID transmitted from the sub-board at the transmission step through one of the plurality of common communication connectors provided on the main-board; an analysis step of analyzing the configuration information acquired at the configuration information acquisition step and which ordinal number of a connector, of the plurality of common communication connectors, has received the information; and a control step of controlling the sub-board on the basis of information analyzed at the analysis step.

The further features of the present invention will be apparent from the best mode for embodying the present invention and the accompanying drawings.

The invention is particularly advantageous since it can cope with diversified board arrangements and avoid an unnecessary increase in cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of a board type ID table of the embodiment according to the present invention;

FIG. 6 is a view showing an example of a combination table of the embodiment according to the present invention;

FIGS. 12A, 12B, 12C, and 12D are views showing other display examples of the warning display unit in the embodiment according to the present invention;

FIG. 14 is a flowchart for explaining the processing of detecting connector connection states in the embodiment according to the present invention.

DETAILED DESCRIPTION OF THE PREFERRED EMBODIMENTS

Preferred embodiments of the present invention will now be described in accordance with the accompanying drawings.

<Overall Arrangement of Control Board>

Figure 1:
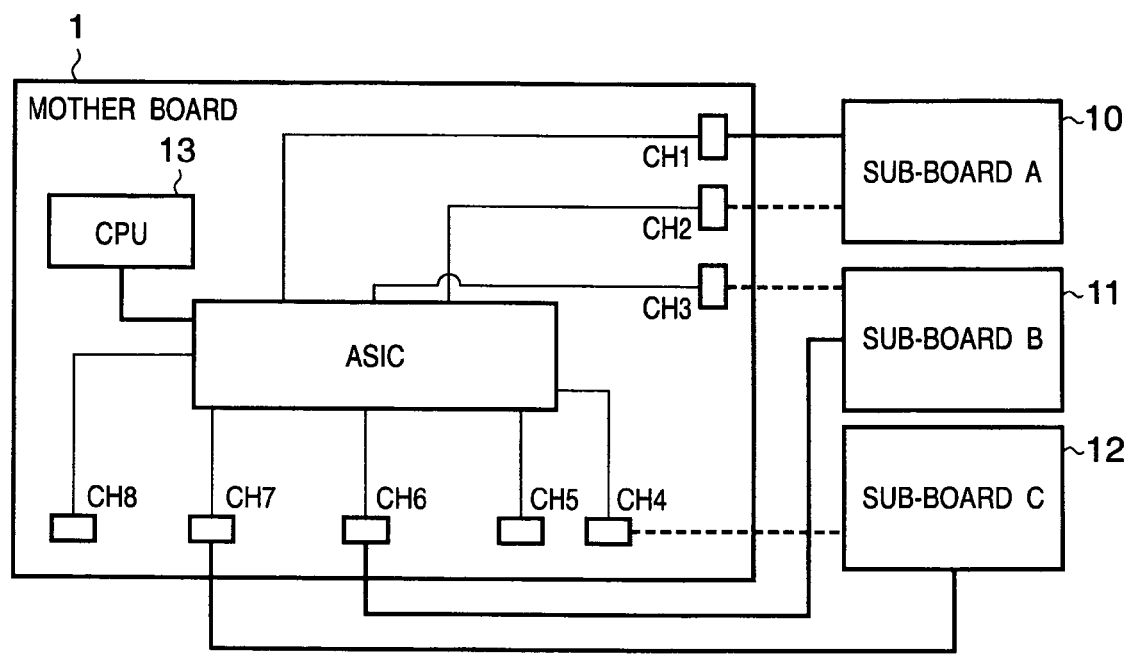
FIG. 1 is a view for explaining the arrangement of a control board of an embodiment according to the present invention.

FIG. 1 is a view showing a connection form of a mother board (hereinafter referred to as "main-board") and sub-boards of an embodiment according to the present invention.

A sub-board A 10 is connected to a serial connector CH-1 on a mother board 1, a sub-board B 11 is connected to a serial connector CH-6, and a sub-board C 12 is connected to a serial connector CH-7. Referring to FIG. 1, the connection states are drawn with the solid lines. In addition, in an arrangement according to this embodiment, the same control can be applied to a form in which connection is made in the manner indicated by the dotted lines. In other words, each sub-board is connectable to any of these connectors.

Figure 2B:
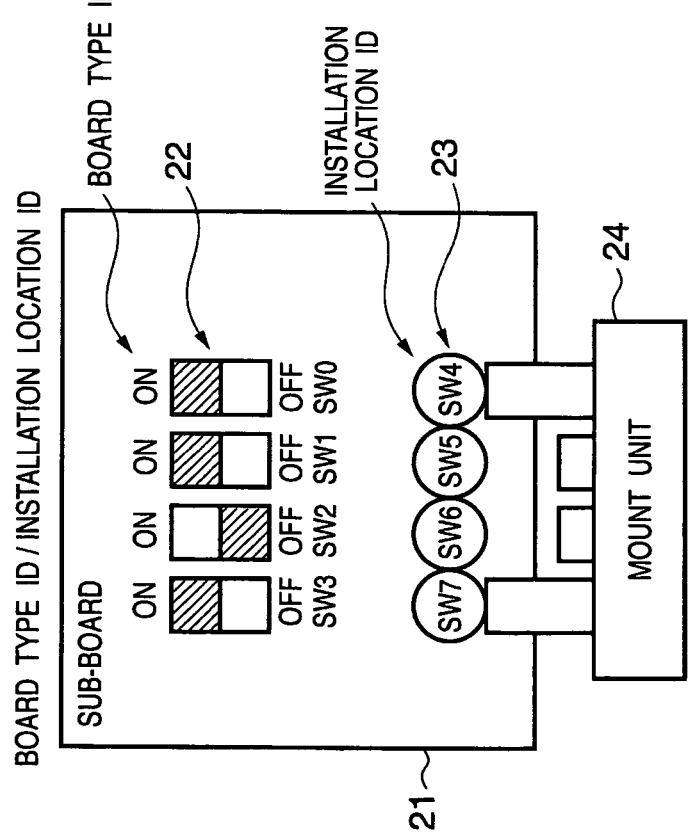
FIGS. 2A and 2B are views each showing an example of the arrangement of sub-boards connected to the control board of the embodiment according to the present invention.
Figure 2A:
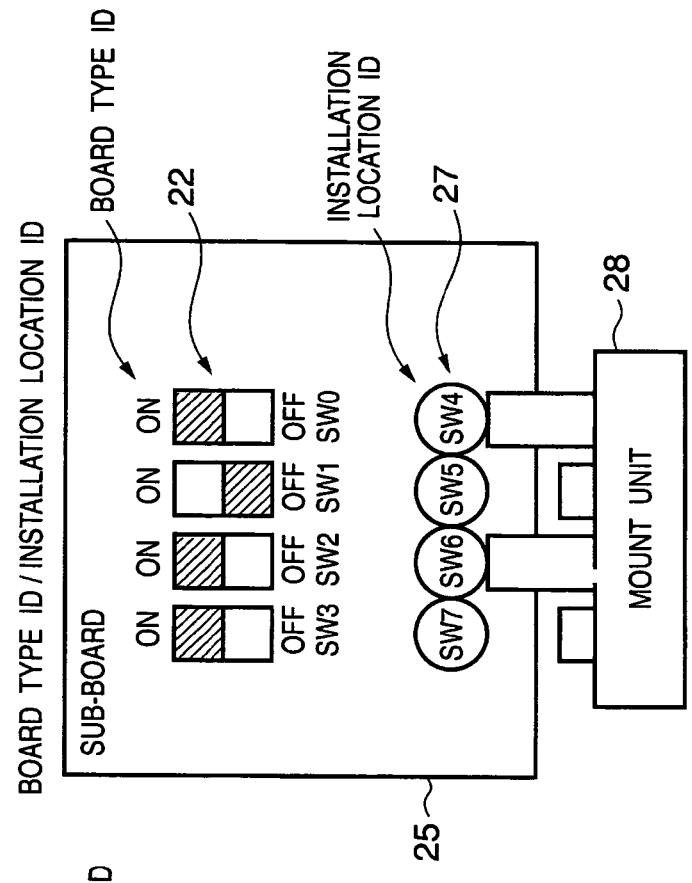

FIGS. 2A and 2B are views each showing a specific implementation for board IDs and board installation location IDs. Referring to FIGS. 2A and 2B, on sub-boards 21 and 25, switch units 22 and 26 capable of setting board type IDs are arranged, respectively. With these switch units, sub-boards are classified into board types, for example, a motor driving sub-board, AD input sub-board, and high-voltage-output sub-board. Motor driving sub-boards differ in ID depending on whether they are for two-phase driving, four-phase driving, five-phase driving, and the like for stepping motors.

In the example shown in FIG. 2A, on the sub-board 21, switches SW3, SW1, and SW0 are set ON. In the example shown in FIG. 2B, on the sub-board 25, switches SW3, SW2, and SW0 are set ON.

In addition, circuits for recognizing installation location IDs are arranged on the sub-boards 21 and 25 to make it possible to recognize at which locations the sub-boards are installed on the apparatus. Referring to FIGS. 2A and 2B, switch units 23 and 27 on the sub-boards are pushed by mechanical projections 24 and 28 protruding from the installation locations to allow recognition of the installation locations. Such mechanical projections differ in type depending on whether they are located, and no identical projections are arranged on the apparatus.

In the examples shown in FIGS. 2A and 2B, switches SW7 and SW4 on the sub-board 21 are turned on by the projection, and switches SW6 and SW4 on the sub-board 25 are turned on by the projection, thereby indicating installation location IDs.

Data indicating statuses of switches SW0 to SW7 are sent from the sub-boards to the main board. This makes it possible for the main board to recognize sub-board installation locations and the types of sub-boards in the image forming apparatus, based on combinations of switches SW0 to SW7.

<Image Forming Apparatus>

The arrangement of an image forming apparatus 30 including a control board of a representative embodiment according to the present invention will be described with reference to FIG. 3.

Figure 3:
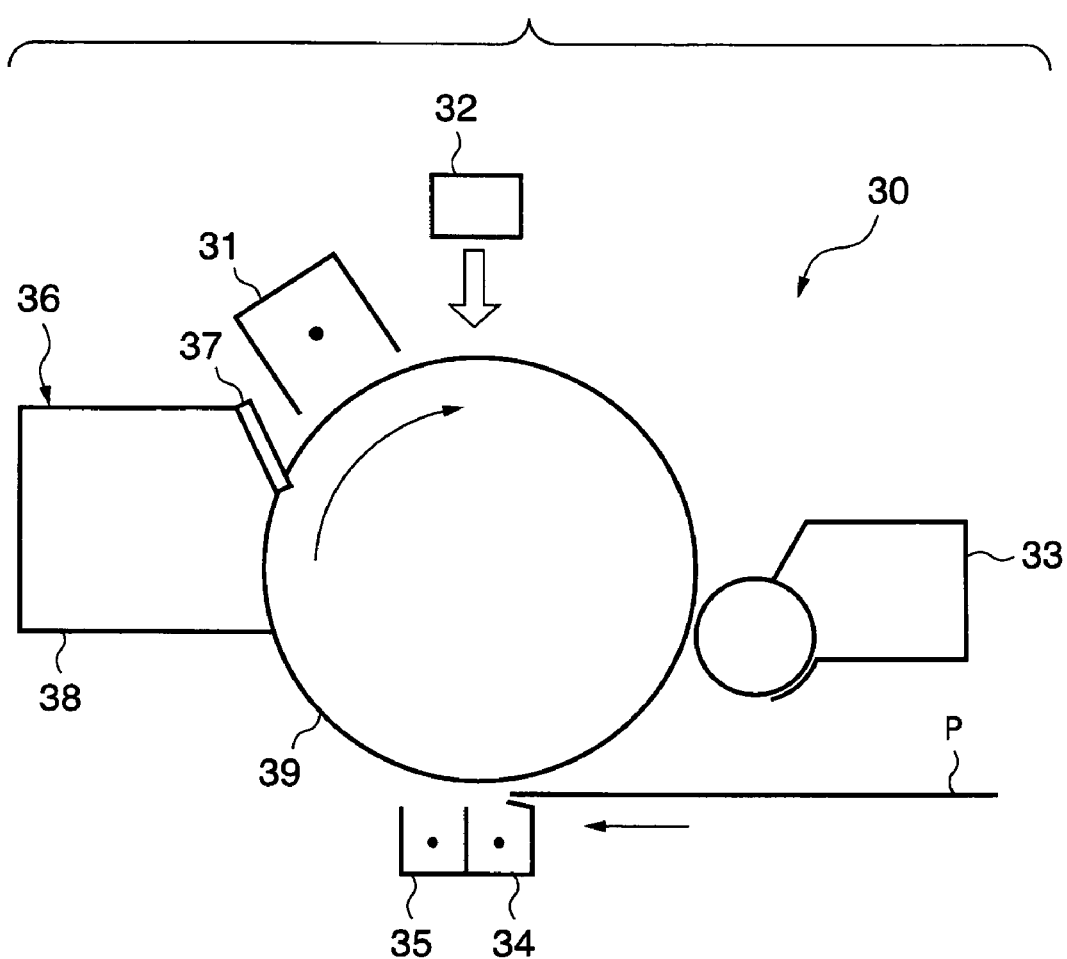
FIG. 3 is a schematic view of an image forming apparatus of the embodiment according to the present invention.

Referring to FIG. 3, reference numeral 39 denotes a photosensitive drum such as an electrophotographic photosensitive member. A photosensitive drum as an image bearing member rotates in the direction indicated by the arrow, and the surface of the photosensitive drum is exposed by a charger 31 to form an electrostatic latent image on the surface. This electrostatic latent image is visualized by a developing device 33 using a developing agent such as toner to become a developed image. A printing sheet P onto which the developed image is transferred by a transfer device 34 is separated from the photosensitive drum 39 by a separating unit 35, and is conveyed to a fixing device (not shown), by which the developed image is fixed on the printing sheet P. The residual toner left on the photosensitive drum without being transferred is removed by a cleaner member 37 such as a cleaner blade or roller, and is stored as waste toner in a cleaner container 38 of a cleaner unit 36.

Figure 4:
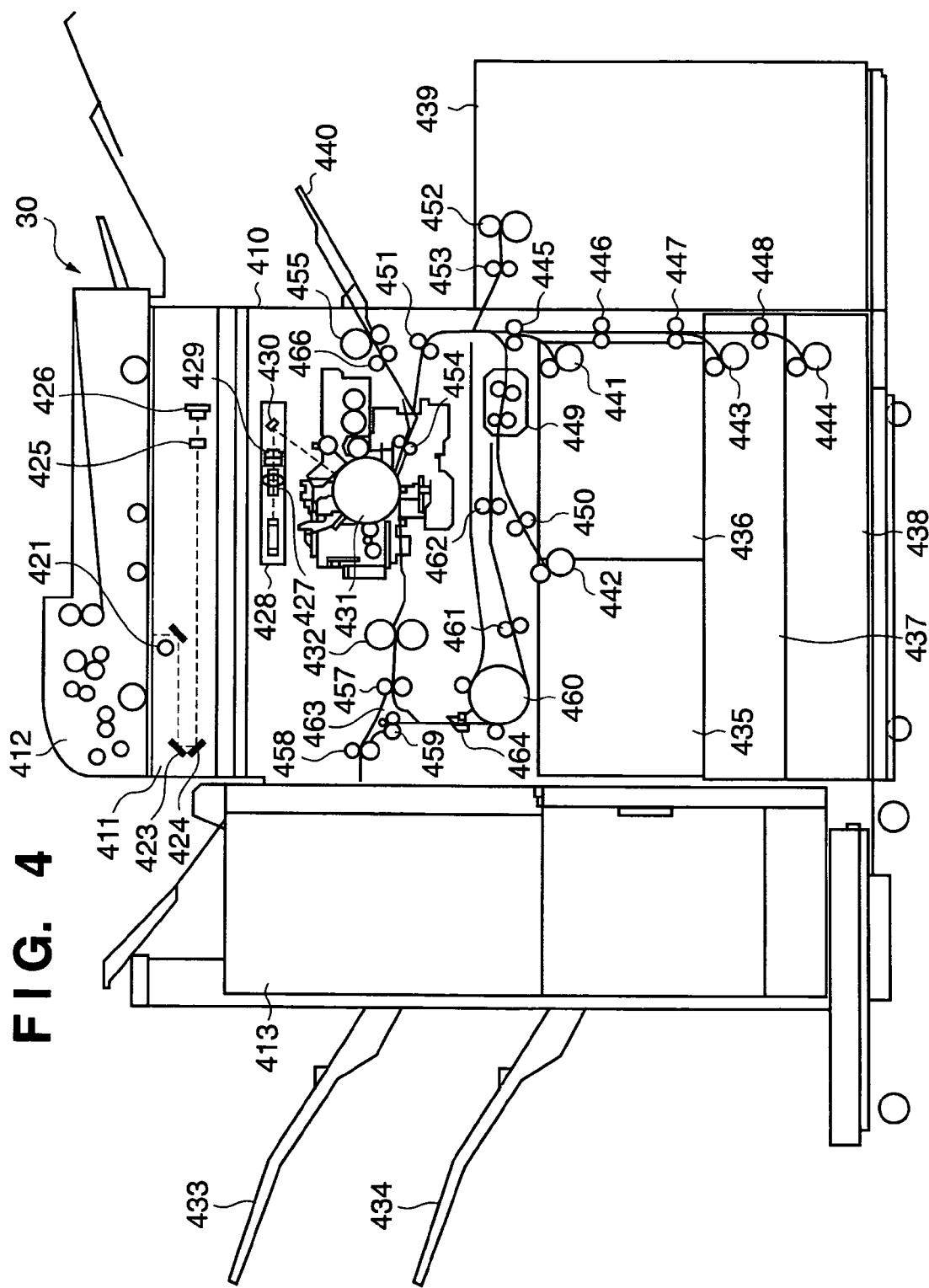
FIG. 4 is a view showing the overall arrangement of the image forming apparatus of the embodiment according to the present invention.

FIG. 4 is a sectional side view showing the main internal arrangement of the image forming apparatus 30.

The image forming apparatus 30 comprises an image output unit 410 as a device which outputs a printing sheet on which an original image is formed, an image input unit 411 as a device which reads image data from an original, an automatic document feeder 412 mounted on the image input unit 411, and a sorter 413 which sorts copy sheets discharged from the image output unit 410 according to bins and discharges the sheets.

The image forming apparatus 30 is, for example, a digital copying machine. An original image is received as image data into the apparatus by the CCD of the image input unit 411 as a device which reads image data from an original. After necessary image processing is performed for the image data, the resultant data is stored in the image memory. The image data is then transferred to the image output unit 410, and is reproduced as an image and copied on a printing sheet.

The image input unit 411 includes a light source 421 which scans an original placed on an original platen on the upper surface of the unit while emitting light onto the original. The light source 421 receives driving force from a motor (not shown) and is reciprocally driven in the lateral direction. Light emitted from the light source 421 is reflected by the placed original to form an optical image. The optical image is transferred to a CCD 426 through mirrors 422, 423, and 424 and a lens 425. The mirrors 422, 423, and 424 are driven integrally with the light source 421. The CCD 426 is comprised of a photoelectric transducer, which functions to convert the transferred optical image into an electrical signal. This signal is further converted into a digital signal (image data).

Each adjustment value in the image input unit is stored in a backup storage device. The received image data of the original is subjected to various kinds of correction processing and image processing desired by the user. The resultant data is stored in an image memory (not shown). Each adjustment value in these image processing devices is stored in a backup storage device.

The image output unit 410 reads out image data stored in the image memory, and re-converts the digital signal into an analog signal. The analog signal obtained by re-conversion is amplified into a proper output value by an exposure control unit (not shown). The resultant signal is converted into an optical signal by an optical irradiation unit 427.

This optical signal propagates through a scanner 428, lens 429, and mirror 430 to be irradiated onto a photosensitive drum 431 (39 in FIG. 4), thereby forming an electrostatic latent image. This latent image is visualized by toner and transferred onto a printing sheet conveyed in the apparatus body. In addition, the toner image is fixed on the printing sheet by fixing rollers 432, and the image is finally printed. The printing sheet is then sent to the sorter 413.

Each adjustment value in the image output unit is stored in a backup storage device.

Referring to FIG. 4, the sorter 413 is a device which is installed on the left side of the image output unit 410, and performs the processing of sorting and discharging printing sheets output from the image output unit 410 onto an upper paper discharge tray 433 and lower paper discharge tray 434. The paper discharge trays are controlled by a control unit (not shown). An output printing sheet is discharged onto an arbitrary paper discharge tray (upper or lower tray) indicated by the control unit.

A right deck 436, left deck 435, upper cassette 437, and lower cassette 438 as paper feed trays are arranged in the lower portion of the image output unit 410, and a side deck 439 as another paper feed tray is installed on the right side of the image output unit 410. (The lower deck of the image output unit 410, each cassette, and the side deck can store about 1,500 sheets, 550 sheets, and 3,500 sheets, respectively). The control unit conveys stored printing sheets from the paper feed trays 435, 436, 437, 438, and 439, and performs image output operation.

An operator sets sheets in the paper feed trays 435 and 436. In this case, the size and direction of sheets are set, and the set data are stored in a backup storage device.

A manual insertion tray 440 which allows the operator to relatively easily feed a small number of copy sheets of an arbitrary type is installed on the left side of the image output unit 410. In addition, the manual insertion tray 440 is used to feed a special printing sheet such as an OHP sheet, thick paper, or postcard-size sheet.

Each of feed rollers 441, 442, 443, 444, and 452 is comprised of three rollers including a pickup roller (not shown) which picks up a sheet, a conveyance roller (on the upper side) which conveys the sheet, and a separation roller (on the lower side) which separates a bundle of sheets.

Each feed roller is driven by a corresponding stepping motor. That is, when a right deck motor, left deck motor, upper cassette motor, and lower cassette motor are driven, the right deck paper feed unit, left deck paper feed unit, upper cassette paper feed unit, and lower cassette feed unit perform paper feed operation, respectively. The side deck paper feed unit is operated by a side deck motor (stepping motor), coupled to side deck drawing rollers 453, through a clutch, thereby performing paper feed operation.

Conveyance rollers will be described next.

Registration rollers 454 are driven by a stepping motor to convey a sheet. Multi-feed rollers 455, multi-drawing rollers 456, left deck drawing rollers 450 are driven by a main motor through a clutch to convey a sheet. The fixing roller 432 and internal paper discharge rollers 457 are driven by a fixing motor.

Vertical path conveyance rollers 445, vertical path conveyance rollers 446, vertical path conveyance rollers 447, and vertical path conveyance rollers 448 are respectively driven by stepping motors. Double-sided copying aid conveyance rollers 449 are driven by a vertical path double-sided copying aid conveyance motor (stepping motor). Pre-registration rollers 451 are driven by a pre-registration motor (stepping motor). External paper discharge rollers 458 are driven by an external paper discharge motor (stepping motor). Reversing rollers 460 are driven by a reversing motor (stepping motor). Double-sided copying aid right rollers 461 are driven by a double-sided copying aid right motor (stepping motor). Double-sided copying aid left rollers 462 are driven by a double-sided copying aid left motor (stepping motor).

Some of these stepping motors may be operated by the same driving method (in view of a leading edge of a drive signal, a trailing edge of the drive signal, and rotational speed). For example, according to the arrangement of the paper feed unit in this embodiment, the right deck paper feed unit, left deck paper feed unit, upper cassette paper feed unit, and lower cassette paper feed unit are driven by the same type of motors. The same motor control is utilized for these units. For this reason, when a sub-board is responsible for controlling each motor (as in this embodiment), the respective paper feed units can be controlled by the same type of sub-board. Likewise, each of the vertical path rollers 445 to 448 can be controlled by the same type of sub-board.

<Sub-board Type ID>

Sub-board type IDs will be described next with reference to FIG. 5.

As shown in FIG. 5, a sub-board type ID is determined by a combination of four bits. The respective bits represent the ON (1)/OFF (0) states of switches SW0 to SW3. In this manner, information indicating the specific type of sub-board is pre-registered by using switches SW0 to SW3 as a board type ID. If the board type ID determined by the ON/OFF states of switches SW3, SW2, SW1, and SW0 represents board type ID=0001, the corresponding sub-board is a sub-board which can take care of A motor (stepping motor) driving control and input operation of one sensor.

If board type ID=0010, the corresponding sub-board is a sub-board which can take care of B motor driving control for a stepping motor, which is different from A motor driving control, and input operation of one sensor.

If board type ID=1101, the corresponding sub-board is a sub-board which performs input operation of two analog signals (AD). Control types in a one-to-one correspondence with the respective board type IDs are registered, although not all of them are described.

Board type ID=0111 to board type ID=1010 are IDs reserved as spare IDs to cope with future changes.

<Combination Table of Installation Location IDs and Sub-board IDs>

FIG. 6 is a view showing a table indicating the combinations of installation location IDs and sub-board type IDs of sub-boards pre-registered according to this embodiment.

In the image forming apparatus 30, as described above, since the upper cassette paper feed unit indicated by installation location ID=0001 and the lower cassette paper feed unit indicated by installation location ID=0010 can be processed by the same control, it suffices to use identical board type IDs. Although not shown in FIG. 6, the same sub-board can be used for the right deck paper feed unit and left deck paper feed unit, and hence the two feed units accept identical board type IDs.

Installation location ID=0011 indicates the first vertical path conveyance rollers (vertical path convey rollers 445); installation location ID=0100, the second vertical path conveyance rollers (vertical path convey rollers 446); installation location ID=0101, the third vertical path conveyance rollers (vertical path convey rollers 447); and installation location ID=0110, the fourth vertical path conveyance rollers (vertical path convey rollers 448). Since these rollers can be processed by the same control, identical sub-board type IDs are registered (in this case, the same sub-board type ID as that of the upper and lower cassette feed units is used).

Installation location ID=1100 indicates a fixing unit 2. Input control is performed for a temperature sensor for reading the temperature of the fixing unit 2 by using this ID, and a sub-board for obtaining the temperatures of the central portion and end portion of the fixing unit 2 is installed. The primary high-voltage unit indicated by installation location ID=1101 and the transfer high-voltage unit indicated by installation location ID=1110 are subjected to the same control in terms of high-voltage-output operation. Therefore, the same sub-board is used for them.

Figure 7:
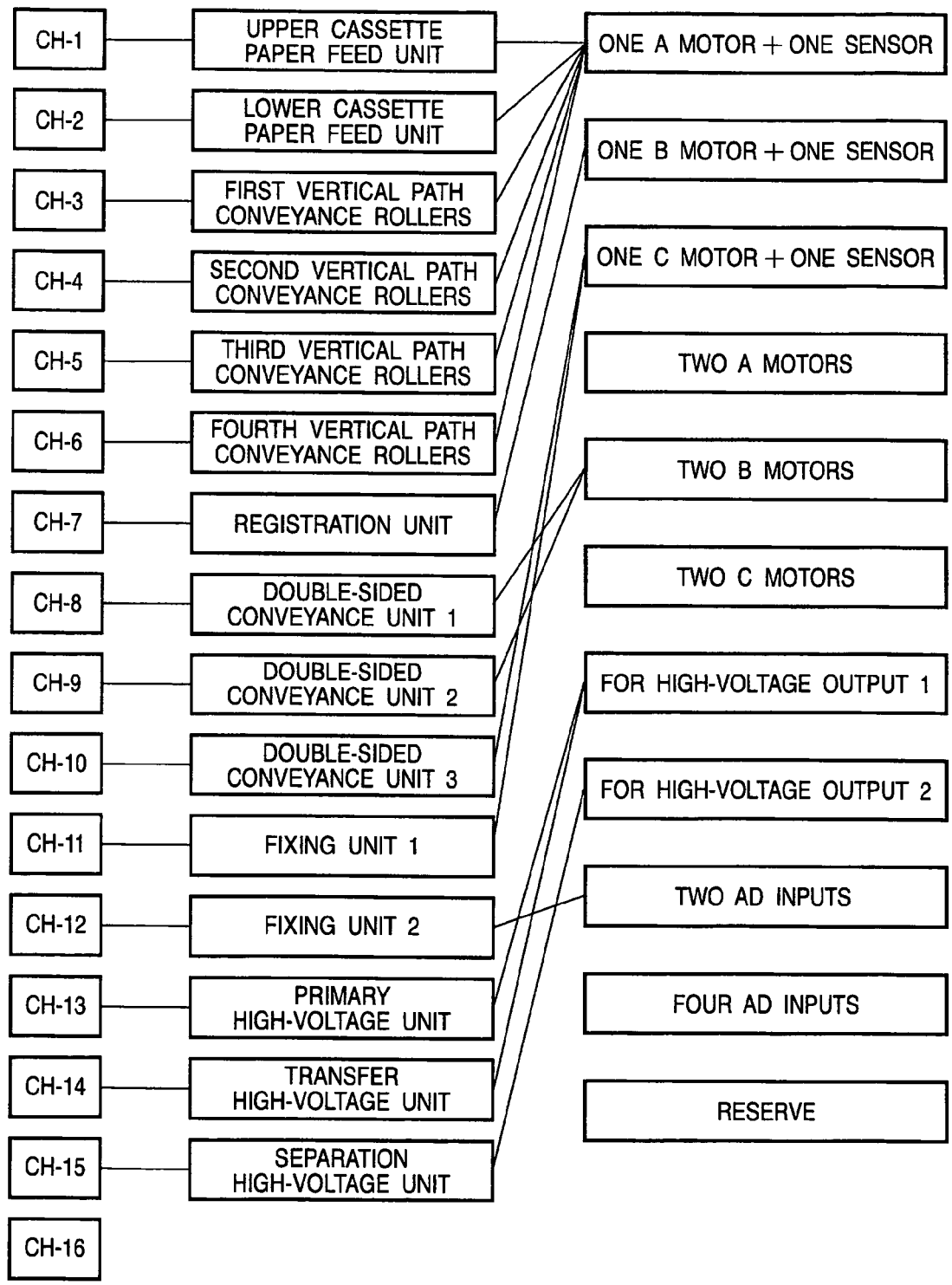
FIG. 7 is a view showing a specific example of connection between a mother board and sub-boards of the embodiment according to the present invention.
Figure 8:
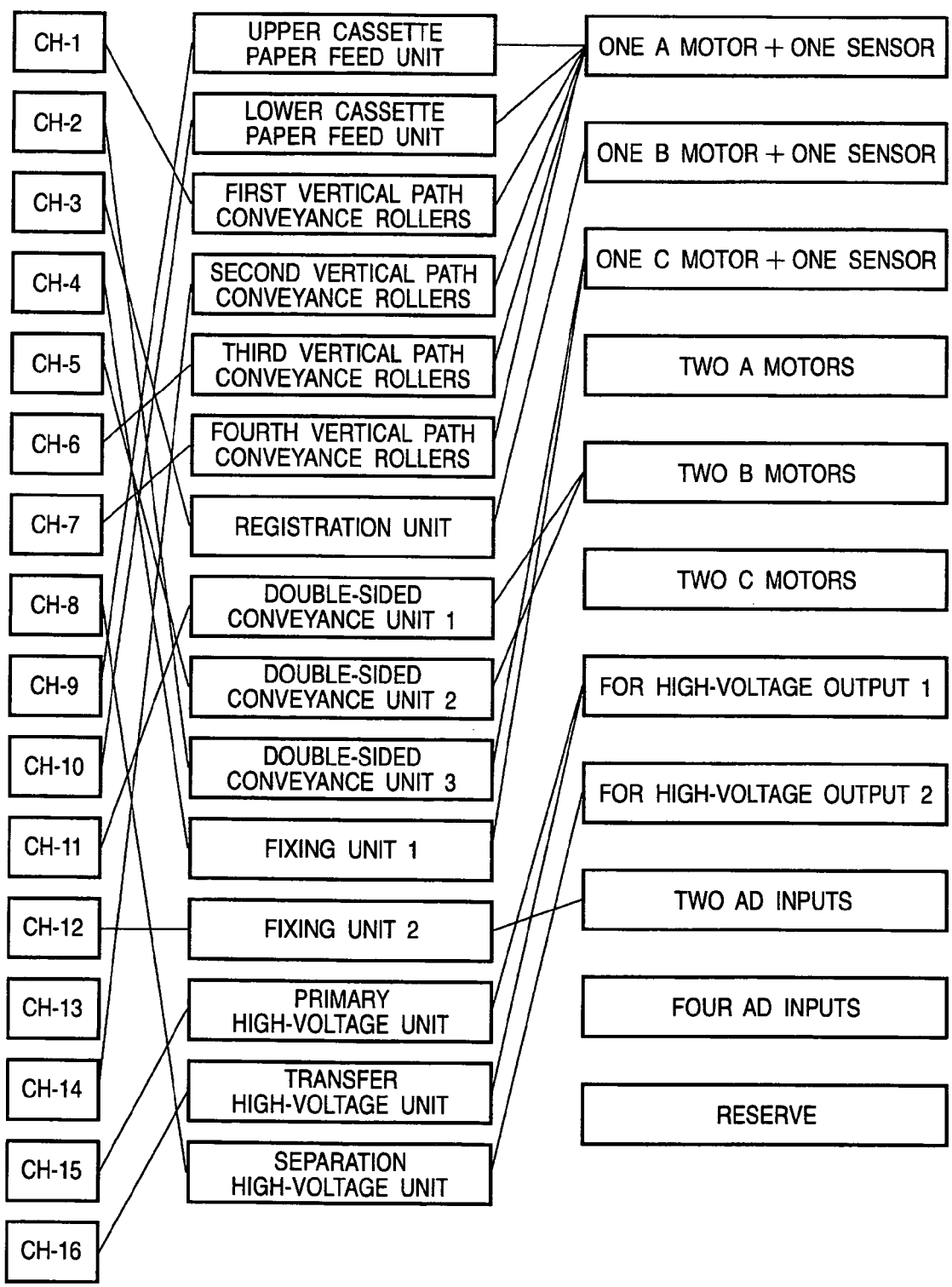
FIG. 8 is a view showing another specific example of connection between a mother board and sub-boards of the embodiment according to the present invention.

FIGS. 7 and 8 show proper wiring in the arrangement of the image forming apparatus according to this embodiment. In both of the connection form shown in FIG. 7 and the connection form shown in FIG. 8, installation location IDs and sub-board IDs are wired in the same manner as the combinations registered as shown in FIG. 6. Only channels used for communication differ on the mother board side.

A CPU 13 on the mother board can determine to which a combination of installation location ID and board type ID and a communication channel are connected. The CPU 13 can therefore recognize and control each sub-board regardless of whether the connection form is the one in FIG. 7 or in the one in FIG. 8.

Figure 9:
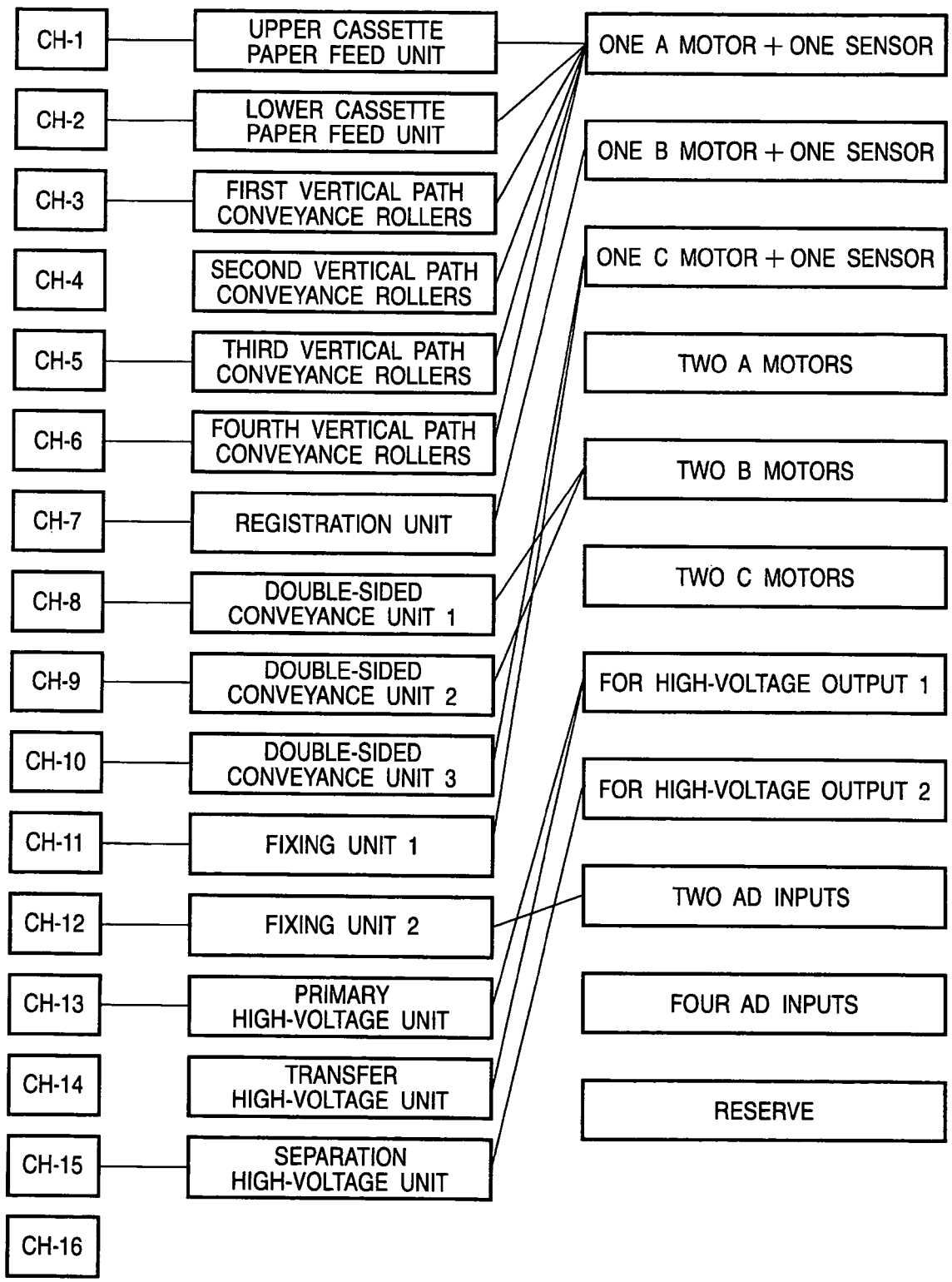
FIG. 9 is a view showing still another specific example of connection between a mother board and sub-boards of the embodiment according to the present invention.

FIG. 9 shows a specific example of connection. In the connection state shown in FIG. 9, the elements indicated by installation location ID=0100 and installation location ID=1110 are not connected to any communication channels. Therefore, warning display is executed as shown in FIGS. 11A and 11B.

Figure 11B:
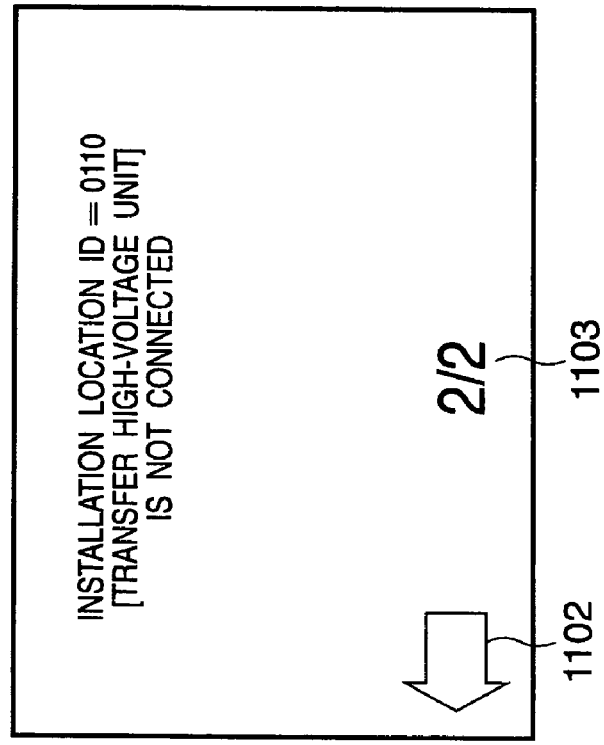
FIGS. 11A and 11B are views each showing an example of a warning display unit in the embodiment according to the present invention.
Figure 11A:
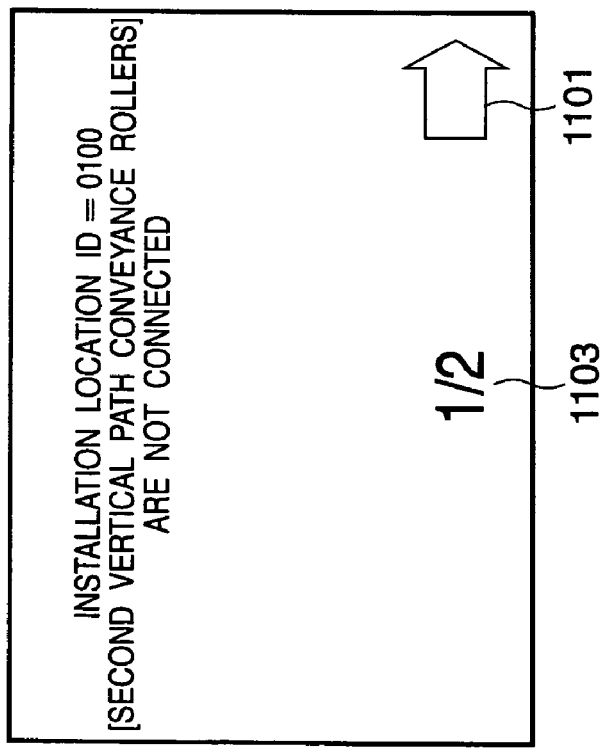

In the warning displays shown in FIGS. 11A and 11B, reference numeral 1101 denotes a key for advancing to the warning window of the next item when a plurality of warnings are to be made; 1102, a key for returning to the warning window of the previous item when a plurality of warnings are to be made; and 1103, an indication which indicates to which item the current warning display window belongs and the total number of items. FIG. 11A shows the warning display of the first item. FIG. 11B shows the warning display of the second item. In this embodiment, warning displays are used. However, beeping sounds may be generated in addition to them.

Figure 10:
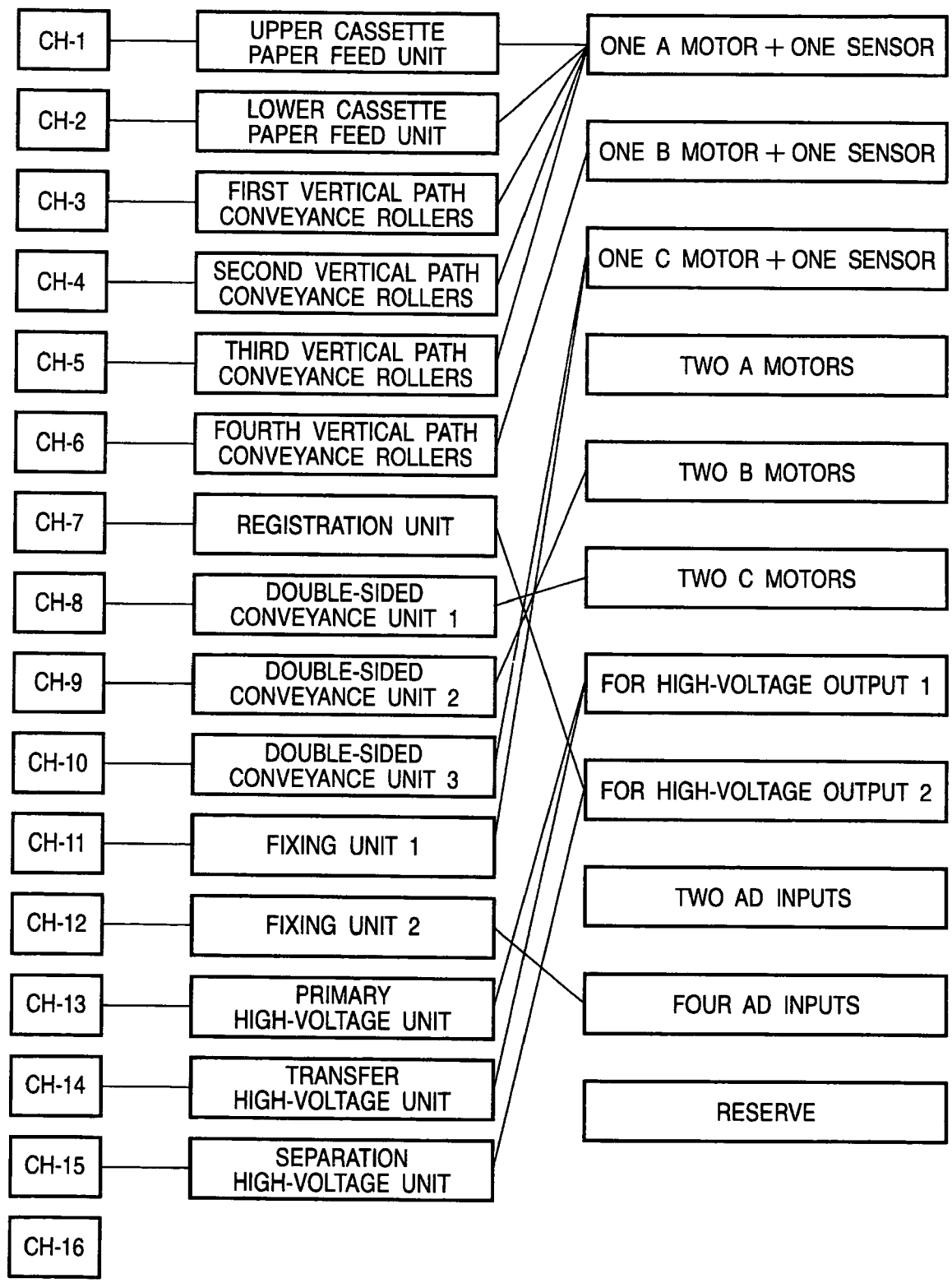
FIG. 10 is a view showing still another specific example of connection between a mother board and sub-boards of the embodiment according to the present invention.

FIG. 10 shows another specific example of connection. Referring to FIG. 10, although all the installation location IDs are connected, the board type ID connected to the fourth vertical path conveyance rollers indicated by installation location ID=0110 is "0010" in the combinations of installation location IDs and board type IDs. That is, the sub-board indicated by the correct board type ID, i.e., 0001 (one A motor+one sensor), is not connected.

The board type ID of the sub-board connected to the registration unit indicated by installation location ID=0111 is "1100". That is, this sub-board is not the sub-board for "one B motor+one sensor" indicated by the correct board type ID, i.e., 0010. Referring to FIG. 10, connection errors have occurred at a total of four portions. In this case, as shown in FIGS. 12A to 12D, warnings are displayed on the warning display unit.

In the warning displays shown in FIGS. 12A to 12D, reference numeral 1201 denotes a key for advancing to the warning window of the next item when a plurality of warnings are to be made; 1202, a key for returning to the warning window of the previous item when a plurality of warnings are to be made; and 1203, an indication which indicates to which item the current warning display window belongs and the total number of items. FIG. 12A shows the warning display of the first item. FIG. 12B shows the warning display of the second item. FIG. 12C shows the warning display of the third item. FIG. 12D shows the warning display of the fourth item. In this embodiment, .warning displays are used. However, beeping sounds may be generated in addition to them.

<ID Combination Analysis Processing>

Figure 13:
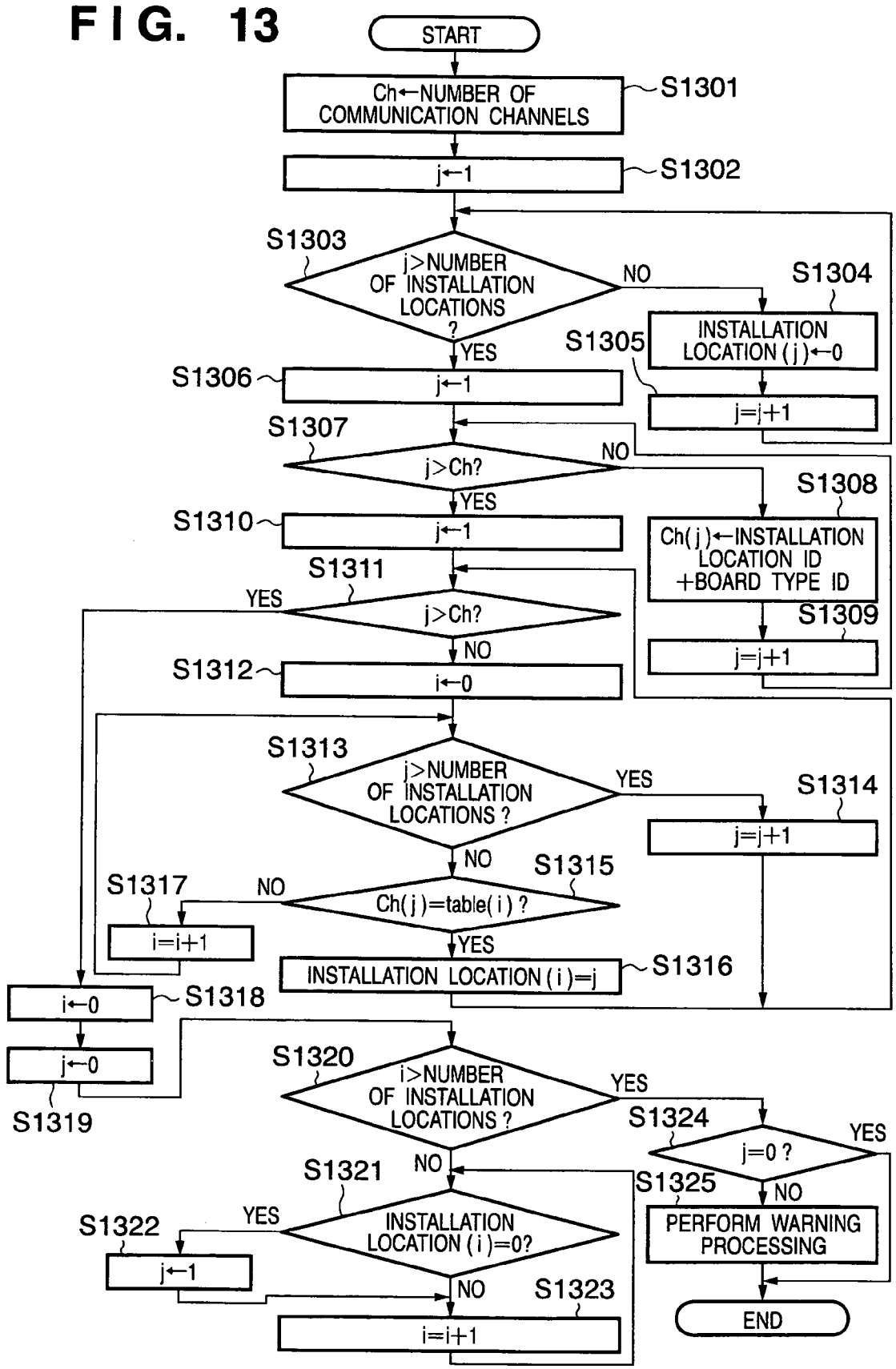
FIG. 13 is a flowchart for explaining ID analysis processing of the embodiment according to the present invention.

FIG. 13 is a flowchart for explaining the operation of analysis (confirmation) processing of combinations of installation location IDs and board type IDs. Note that the CPU 13 controls the processing based on this flowchart.

In step S1301, the number of communication channels is input to the variable (Ch). The flow then advances to step S1302.

In step S1302, "1" is input to the variable (j), and the flow advances to step S1303.

Since only one installation location exists for each device, the processing from step S1303 to step S1305 is repeated by the number of installation locations with j being a repetition variable.

In step S1303, the variable (j) is compared with the number of installation locations. If the variable (j) becomes greater than the number of installation locations, the flow advances to step S1306. If the variable (j) is equal to or less than the number of installation locations, the flow advances to step S1304.

In step S1304, "0" is input to the j-th array variable corresponding to the number of installation locations. The flow then advances to step S1305.

In step S1305, "1" is added to the variable (j). The flow then returns to step S1303. In step S1306, "1" is input to the variable (j) again. The flow then advances to step S1307.

In this flowchart, the processing from step S1307 to step S1309 is repeated to obtain (acquire) the configuration information of the sub-board type ID of each sub-board connected to the mother board and a corresponding installation location ID. Note that the configuration information of sub-board information and an installation location, connected to each communication channel, is acquired. Such information is acquired by repeating the processing for each communication channel from the first by the number of communication channels.

In step S1307, it is determined whether the repetition processing is terminated. If the variable (j) is greater than the number of channels, it is determined that the repetition processing is terminated. The flow then advances to step S1310. If it is determined that the repetition processing is not terminated (the variable (j) is equal to or smaller than the number of channels), the flow advances to step S1308.

In step S1308, the configuration information of the installation location ID and board type ID is written to the j-th address of the array variable Ch. The flow then advances to step S1309.

In step S1309, "1" is added to the value of the variable (j). The flow then returns to step S1307.

In step S1310, the variable (j) is set to "1" to prepare for repetition processing again. The flow then advances to step S1311. The repetition of processing from step S1311 to step S1317 is the process of comparing the configuration information of the sub-board ID and installation location ID, written in the array variable Ch, with a combination table of sub-board IDs and installation location IDs, pre-written in a ROM table or the like.

In step S1311, the variable (j) is compared with the variable (Ch) (the number of communication channels). If j>Ch and the repetition processing is terminated, the flow advances to step S1318. In contrast, if j≦Ch and the repetition processing is not terminated, the flow advances to step S1312.

In step S1312, the variable (i) for the second repetition processing is cleared to "0". The flow then advances to step S1313.

In step S1313, the variable (j) is compared with the number of installation locations. If the variable (j) is equal to or less than the number of installation locations, the flow advances to step S1315. If the variable (j) is greater than the number of installation locations, the flow advances to step S1314.

In step S1314, since the second repetition is terminated, "1" is added to the variable (j). The flow then returns to step S1311.

In step S1315, the j-th connection information acquired in step S1308 is compared with the i-th information in the combination table on the ROM table. If they coincide with each other, the flow advances to step S1316. If they do not coincide, the flow advances to step S1317.

In step S1316, the j-th connection information coinciding with the i-th information is written into the i-th variable installation location initialized in step S1304. The flow then returns to step S1311.

In step S1317, "1" is added to the variable (i), and the flow returns to step S1313. In step S1318, the variable (i) used as a repetition variable is initialized. The flow then advances to step S1319. In step S1319, the variable (j) is initialized as in step S1318. The flow then advances to step S1320. The variable (j) is a flag used for determining whether all pieces of connection configuration information coincide with the combination table in the ROM table.

In step S1320, the variable (i) is compared with the number of installation locations to perform repetition processing corresponding to the number of installation locations. If the variable (i) is greater than the number of installation locations, the flow advances to step S1324. Otherwise, the flow advances to step S1321.

In step S1321, it is determined whether the value of the i-th installation location array variable is "0" (kept initialized). If the value is "0", the flow advances to step S1322. If a value other than "0" is written, the flow advances to step S1323. In step S1322, "1" is written into the variable (j). The flow then advances to step S1323.

In step S1323, "1" is added to the variable (i). The flow then returns to step S1321. In step S1324, it is determined whether the variable (j) is "0". If j=0, it is determined that there is no error with respect to the installation locations, and the processing is immediately terminated. If j≠0, the flow advances to step S1325.

In step S1325, it is determined that improper connection exists in the connection state with respect to the mother board or an unconnected board or incorrect connection exists, and warning processing is performed. The processing is then terminated. Since the warning processing has been described with reference to the views of warning displays, a description thereof will be omitted.

<Connector Connection State Detection Processing>

FIG. 14 is a flowchart for explaining the processing of detecting the connection state of a connector and executing warning on the basis of the detection result. Note that the CPU 13 controls the processing based on this flowchart.

In step S1401, the variable is initialized. That is, the variable (i) for the repetition of processing corresponding to the number of communication channels is initialized to "0". The flow then advances to step S1402.

In step S1402, the variable (i) is compared with the number of communication channels. If the variable (i) is greater than the number of communication channels, the flow advances to step S1405. Otherwise, the flow advances to step S1403.

In step S1403, the configuration information of the installation location ID and board type ID, connected to the channel (i), is obtained and written into the i-th address of the array variable CH. The flow then advances to step S1404.

In step S1404, "+1" is added to the variable (i). The flow then returns to step S1402. In step S1405, the variable (i) for repetition processing is cleared to "0" again. The flow then advances to step S1406.

In step S1406, a flag used for determining whether to perform warning processing is turned off. The flow then advances to step S1407. In step S1407, the same comparison as that in step S1402 is performed. If it is determined upon comparison that the variable (i) is greater than the number of communication channels, the flow advances to step S1413. Otherwise, the flow advances to step S1408.

In step S1408, the information used in step S1403 is obtained (acquired) again. The configuration information of the installation location ID and board type ID, connected to the channel (i), is set to the variable (info). The flow then advances to step S1409.

In step S1409, it is determined whether the information acquired in step S1408 coincides with the information acquired in step S1403. If they do not coincide with each other, the flow advances to step S1410. If they coincide with each other, the flow advances to step S1411.

In step S1410, since it is determined that the initial information differs from the current information, the flag for warning information is turned on. The flow then advances to step S1411. In step S1411, the variable (info) data to which the current information is written is written into the i-th address of array variable CH. The flow then advances to step S1412.

In step S1412, "+1" is added to the variable (i). The flow then returns to step S1407.

In step S1413, it is determined whether the warning processing flag is OFF. If it is determined that the flag is OFF, it is determined that this check has found no change in connection state. The flow therefore immediately returns to step S1405. In contrast to this, if it is determined that the flag is ON, the flow advances to step S1414.

In step S1414, a warning is generated as in the above warning display processing. The flow then advances to step S1415. In step S1415, processing is performed to acquire configuration information again.

Other Embodiment

The present invention is realized even by supplying a storage medium storing the program codes of software for realizing the functions (corresponding to the flowcharts of FIGS. 13 and 14) of the above embodiment to a system or apparatus, and causing the computer (CPU or MPU) of the system or apparatus to read out and execute the program codes stored in the storage medium. In this case, the program codes themselves read out from the storage medium realize the functions of the embodiments described above, and the storage medium storing the program codes constitutes the present invention. As a storage medium for supplying such program codes, for example, a floppy (TM) disk, hard disk, optical disk, magneto-optical disk, CD-ROM, CD-R, magnetic tape, nonvolatile memory card, or ROM can be used.

In addition, the present invention includes not only a case where the functions of the above embodiment are realized when the readout program codes are executed by the computer but also a case where the functions of the above embodiment are realized when the OS (Operating System) or the like running on the computer performs part or all of actual processing on the basis of the instructions of the program codes.

Furthermore, the present invention includes a case where the functions of the above embodiment are realized in such a manner that program codes read out from the storage medium are written in a memory mounted on a function expansion board inserted into a computer or on a function expansion unit connected to the computer, and a CPU or the like mounted on the function expansion board or unit performs part or all of actual processing on the basis of the instructions of the program codes.

Moreover, obviously, the present invention can be realized by distributing the program codes of the software for realizing the functions of the above embodiment through a network, storing the program codes in a storage means such as the hard disk or memory of a system or apparatus or a storage medium such as a CD-RW or CD-R, and causing the computer (CPU or MPU) of the system or apparatus to read out and execute the program codes stored in the storage means or storage medium.

Effects of Embodiment

According to the above embodiment, the numbers of wires of cables can be the same throughout all sub-boards. In addition, the number of cables can be decreased by using serial communication as a communication method for the respective sub-boards. Furthermore, allowing recognition of a board type ID and installation location ID from each sub-board makes it possible to prevent the operator from forgetting to mount a sub-board or making a mounting error in assembly process.

In addition, since the connection form between the mother board and each sub-board is common, the same control can be realized regardless of to which communication connector a sub-board is connected on the mother board. Furthermore, circuits designed to perform the same control are standardized and formed into a sub-board. This allows sharing of components. With regard to the mother board as well, transferring each load control to the sub-board side makes it possible to further promote the standardization of the mother board.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application Nos. 2004-340809 and 2005-324052 respectively filed on Nov. 25, 2004, and Nov. 8, 2005, the entire contents of which are incorporated herein by reference.

What is claimed is:

1. A control board comprising:
a main-board; and
a plurality of sub-boards which control loads on portions of an electric unit to be implemented,
wherein each of said plurality of sub-boards includes:
   providing means for providing a board type ID for specifying a type of board;
   read means for reading an installation location ID representing a location in the electric unit at which said sub-board is to be installed; and
   transmission means for transmitting the board type ID and the installation location ID read by said read means to said main-board after said sub-board has been installed at the installation location, and
wherein said main-board includes:
   communication control means for controlling communication through a plurality of common communication connectors;
   configuration information acquisition means for acquiring configuration information expressed by a combination of the board type ID and the installation location ID transmitted from said sub-board by said transmission means through one of said plurality of common communication connectors;
   analysis means for analyzing the configuration information acquired by said configuration information acquisition means and which ordinal number of a connector, of said plurality of common communication connectors, has received the information;
   control means for controlling said sub-board on the basis of information analyzed by said analysis means; and
   storage means for storing a predetermined installation location ID and a board type ID of a sub-board to be installed,
   wherein said control means compares the information stored in said storage means with the information analyzed by said analysis means, and generates a warning in a case where the analyzed information is insufficient to represent an overall arrangement of the electric unit.

2. The control board according to claim 1, wherein said control means generates a warning in a case where the information stored in said storage means differs from the information analyzed by said analysis means.

3. A control board comprising:
a main-board; and
a plurality of sub-boards which control loads on portions of an electric unit to be implemented,
wherein each of said plurality of sub-boards includes:
   providing means for providing a board type ID for specifying a type of board;
   read means for reading an installation location ID representing a location in the electric unit at which said sub-board is to be installed; and
   transmission means for transmitting the board type ID and the installation location ID read by said read means to said main-board after said sub-board has been installed at the installation location, and
wherein said main-board includes:
   communication control means for controlling communication through a plurality of common communication connectors;
   configuration information acquisition means for acquiring configuration information expressed by a combination of the board type ID and the installation location ID transmitted from said sub-board by said transmission means through one of said plurality of common communication connectors;
   analysis means for analyzing the configuration information acquired by said configuration information acquisition means and which ordinal number of a connector, of said plurality of common communication connectors, has received the information and;
   control means for controlling said sub-board on the basis of information analyzed by said analysis means,
   wherein said communication control means includes a function of detecting insertion/removal of said sub-board in/from said common communication connector,
   wherein said communication control means controls said transmission means and said configuration information acquisition means to retry communication of the configuration information upon detecting that said sub-board is newly connected,
   wherein said communication control means further controls said transmission means and said configuration information acquisition means to retry communication of the configuration information upon detecting that said common communication connector whose connection has already been detected is in an unconnected state, and
   wherein said control means generates a warning on the basis of information obtained by analysis by said analysis means using the configuration information acquired again by said configuration information acquisition means.

4. An image forming apparatus comprising:
a main-board; and
a plurality of sub-boards which control loads on portions of said apparatus and forms an image by causing each sub-board to control operation required for image formation,
wherein each of said plurality of sub-boards includes:
   providing means for providing a board type ID for specifying a type of board;
   read means for reading an installation location ID representing a location in said apparatus on which said sub-boards have been installed; and
   transmission means for transmitting the board type ID and the installation location ID read by said read means to said main-board after said sub-board has been installed at the installation location, and
wherein said main-board includes:
   communication control means for controlling communication through a plurality of common communication connectors;

configuration information acquisition means for acquiring configuration information expressed by a combination of the board type ID and the installation location ID transmitted from said sub-board by said transmission means through one of said plurality of common communication connectors;

analysis means for analyzing the configuration information acquired by said configuration information acquisition means and which ordinal number of a connector, of said plurality of common communication connectors, has received the information;

control means for controlling said sub-board on the basis of information analyzed by said analysis means; and storage means for storing the predetermined installation location ID and a board type ID of a sub-board to be installed, wherein said control means compares the information stored in said storage means with the information analyzed by said analysis means, and generates a warning in a case where the analyzed information is insufficient to represent an overall arrangement of said apparatus.

5. The apparatus according to claim 4, wherein said control means generates a warning in a case where the information stored in said storage means differs from the information analyzed by said analysis means.

6. An image forming apparatus comprising:
a main-board; and
a plurality of sub-boards which control loads on portions of said apparatus and forms an image by causing each sub-board to control operation required for image formation, wherein each of said plurality of sub-boards includes:
providing means for providing a board type ID for specifying a type of board;
read means for reading an installation location ID representing a location in said apparatus on which said sub-boards have been installed; and
transmission means for transmitting the board type ID and the installation location ID read by said read means to said main-board after said sub-board has been installed at the installation location, and wherein said main-board includes:
communication control means for controlling communication through a plurality of common communication connectors;
configuration information acquisition means for acquiring configuration information expressed by a combination of the board type ID and the installation location ID transmitted from said sub-board by said transmission means through one of said plurality of common communication connectors;
analysis means for analyzing the configuration information acquired by said configuration information acquisition means and which ordinal number of a connector, of said plurality of common communication connectors, has received the information;
control means for controlling said sub-board on the basis of information analyzed by said analysis means,
wherein said communication control means includes a function of detecting insertion/removal of said sub-board in/from said common communication connector,
wherein said communication control means controls said transmission means and said configuration information acquisition means to retry communication of the configuration information upon detecting that said sub-board is newly connected,
wherein said communication control means further controls said transmission means and said configuration information acquisition means to retry communication of the configuration information upon detecting that said common communication connector whose connection has already been detected is in an unconnected state, and
wherein said control means generates a warning on the basis of information obtained by analysis by said analysis means using the configuration information acquired again by said configuration information acquisition means.

7. A management method, in a control board to be implemented in an electric unit and including a main-board and a plurality of sub-boards which control loads on portions of the electric unit, which manages connection between the main-board and the plurality of sub-boards, the method comprising:

a providing step of providing a board type ID for specifying a type of board from each of the plurality of sub-boards;

a read step of reading an installation location ID representing a location in the electric unit at which each of the plurality of sub-boards is to be installed;

a transmission step of transmitting the board type ID and the installation location ID read at said read step to the main-board after each of the plurality of sub-boards has been installed at the installation location;

a configuration information acquisition step of acquiring configuration information expressed by a combination of the board type ID and the installation location ID transmitted from the sub-board at said transmission step through one of the plurality of common communication connectors provided on the main-board;

an analysis step of analyzing the configuration information acquired at said configuration information acquisition step and which ordinal number of a connector, of the plurality of common communication connectors, has received the information; and a control step of controlling said sub-board on the basis of information analyzed at said analysis step, wherein the main-board stores, in a storage medium, a predetermined installation location ID and a board type ID of a sub-board to be installed, and wherein at said control step, the information stored in the storage medium is compared with the information analyzed at said analysis step, and a warning is generated in a case where the analyzed information is insufficient to represent an overall arrangement of the electric unit.

8. The method according to claim 7, wherein at said control step, a warning is generated in a case where the information stored in the storage medium differs from the information analyzed at said analysis step.

9. A management method, in a control board to be implemented in an electric unit and including a main-board and a plurality of sub-boards which control loads on portions of the electric unit, which manages connection between the main-board and the plurality of sub-boards, the method comprising:

a providing step of providing a board type ID for specifying a type of board from each of the plurality of sub-boards;

a read step of reading an installation location ID representing a location in the electric unit at which each of the plurality of sub-boards is to be installed;

a transmission step of transmitting the board type ID and the installation location ID read at said read step to the main-board after each of the plurality of sub-boards has been installed at the installation location;

a configuration information acquisition step of acquiring configuration information expressed by a combination of the board type ID and the installation location ID transmitted from the sub-board at said transmission step through one of the plurality of common communication connectors provided on the main-board;

an analysis step of analyzing the configuration information acquired at said configuration information acquisition step and which ordinal number of a connector, of the plurality of common communication connectors, has received the information;

a control step of controlling said sub-board on the basis of information analyzed at said analysis step;

a detection step of detecting insertion/removal of the sub-board in/from the common communication connector; and a communication control step of controlling said transmission step and said configuration information acquisition step to retry communication of the configuration information upon detecting that the sub-board is newly connected, wherein at said communication control step, said transmission step and said configuration information acquisition step are controlled to retry communication of the configuration information also in a case where said detection step detects that the common communication connector whose connection has already been detected is in an unconnected state, and wherein at said control step, a warning is generated on the basis of information obtained by analysis at said analysis step using the configuration information acquired again at said configuration information acquisition step.

10. A computer-readable storage storing a computer program for executing a management method, in a control board to be implemented in an electric unit and including a main-board and a plurality of sub-boards which control loads on portions of the electric unit, which manages connection between the main-board and the plurality of sub-boards, the method comprising:

a providing step of providing a board type ID for specifying a type of board from each of the plurality of sub-boards;

a read step of reading an installation location ID representing a location in the electric unit at which each of the plurality of sub-boards is to be installed;

a transmission step of transmitting the board type ID and the installation location ID read at said read step to the main-board after each of the plurality of sub-boards has been installed at the installation location;

a configuration information acquisition step of acquiring configuration information expressed by a combination of the board type ID and the installation location ID transmitted from the sub-board at said transmission step through one of the plurality of common communication connectors provided on the main-board;

an analysis step of analyzing the configuration information acquired at said configuration information acquisition step and which ordinal number of a connector, of the plurality of common communication connectors, has received the information; and a control step of controlling said sub-board on the basis of information analyzed at said analysis step, wherein the main-board stores, in a storage medium, a predetermined installation location ID and a board type ID of a sub-board to be installed, and wherein at said control step, the information stored in the storage medium is compared with the information analyzed at said analysis step, and a warning is generated in a case where the analyzed information is insufficient to represent an overall arrangement of the electric unit.

11. A computer-readable storage storing a computer program for executing a management method, in a control board to be implemented in an electric unit and including a main-board and a plurality of sub-boards which control loads on portions of the electric unit, which manages connection between the main-board and the plurality of sub-boards, the method comprising:

a providing step of providing a board type ID for specifying a type of board from each of the plurality of sub-boards;

a read step of reading an installation location ID representing a location in the electric unit at which each of the plurality of sub-boards is to be installed;

a transmission step of transmitting the board type ID and the installation location ID read at said read step to the main-board after each of the plurality of sub-boards has been installed at the installation location;

a configuration information acquisition step of acquiring configuration information expressed by a combination of the board type ID and the installation location ID transmitted from the sub-board at said transmission step through one of the plurality of common communication connectors provided on the main-board;

an analysis step of analyzing the configuration information acquired at said configuration information acquisition step and which ordinal number of a connector, of the plurality of common communication connectors, has received the information;

a control step of controlling said sub-board on the basis of information analyzed at said analysis step;

a detection step of detecting insertion/removal of the sub-board in/from the common communication connector; and a communication control step of controlling said transmission step and said configuration information acquisition step to retry communication of the configuration information upon detecting that the sub-board is newly connected, wherein at said communication control step, said transmission step and said configuration information acquisition step are controlled to retry communication of the configuration information also in a case where said detection step detects that the common communication connector whose connection has already been detected is in an unconnected state, and wherein at said control step, a warning is generated on the basis of information obtained by analysis at said analysis step using the configuration information acquired again at said configuration information acquisition step.

* * * * *